United States Patent
Young

(10) Patent No.: US 9,137,476 B2
(45) Date of Patent: Sep. 15, 2015

(54) USER-DEFINED HOME SCREEN FOR ULTRA HIGH DEFINITION (UHD) TV

(71) Applicant: SONY CORPORATION, Tokyo (JP)

(72) Inventor: David Andrew Young, San Diego, CA (US)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 13/767,185

(22) Filed: Feb. 14, 2013

(65) Prior Publication Data

US 2014/0229836 A1    Aug. 14, 2014

(51) Int. Cl.
*G06F 3/00* (2006.01)
*H04N 5/445* (2011.01)
*H04N 5/44* (2011.01)
*H04N 21/41* (2011.01)
*H04N 21/431* (2011.01)
*H04N 21/485* (2011.01)

(52) U.S. Cl.
CPC ......... *H04N 5/44543* (2013.01); *H04N 5/4403* (2013.01); *H04N 5/44513* (2013.01); *H04N 21/4126* (2013.01); *H04N 21/4312* (2013.01); *H04N 21/4858* (2013.01)

(58) Field of Classification Search
CPC .................. H04N 5/44543; H04N 21/482
USPC .................. 715/719, 720, 721; 725/39, 47
See application file for complete search history.

(56) References Cited

U.S. PATENT DOCUMENTS

| 7,197,715 | B1  |   | 3/2007 | Valeria |
| 2004/0080541 | A1 | * | 4/2004 | Saiga et al. .................. 345/805 |
| 2008/0092173 | A1 | * | 4/2008 | Shannon et al. ............... 725/47 |
| 2010/0153999 | A1 | * | 6/2010 | Yates .............................. 725/39 |
| 2011/0004839 | A1 | * | 1/2011 | Cha et al. ...................... 715/765 |
| 2011/0113353 | A1 |   | 5/2011 | Koh et al. |
| 2012/0054671 | A1 | * | 3/2012 | Thompson et al. ........... 715/784 |
| 2013/0097627 | A1 | * | 4/2013 | Hwang et al. .................. 725/25 |
| 2013/0125050 | A1 | * | 5/2013 | Goshey ......................... 715/800 |

OTHER PUBLICATIONS

Google, In.C, "Google TV Design Patterns" htttp://www.psfk.com/2011/10/version-2-of-google-tv-adds-android-apps-and-redesigns-user-interface.html. Available on date of search Dec. 24, 2012.
LGsolutions, "LG Pro:Centric Smart", http://www.Ihrtimes.com/2012/11/14/lg-enhances-smart-hotel-tv-lineup-with-ui-customerization-new-flexibility. Available on date of search Dec. 24, 2012.

* cited by examiner

*Primary Examiner* — Haoshian Shih
(74) *Attorney, Agent, or Firm* — John L. Rogitz

(57) ABSTRACT

A viewer of a UHD may configure one or more home screens that are associated with that viewer at viewer login by selecting one or more home screen templates, each of which includes multiple content panes arranged in a unique layout. The viewer may modify the layout. Each home screen may be associated with a respective content genus so that, for example, when a sports program is presented and the viewer selects a "home" key on a remote commander, a sports-related home screen is presented based on the viewer-selected sports home screen template, whereas when a feature movie is presented and the viewer selects the "home" key, a movie-related home screen is presented based on the viewer-selected movie home screen template.

15 Claims, 13 Drawing Sheets

System

TV

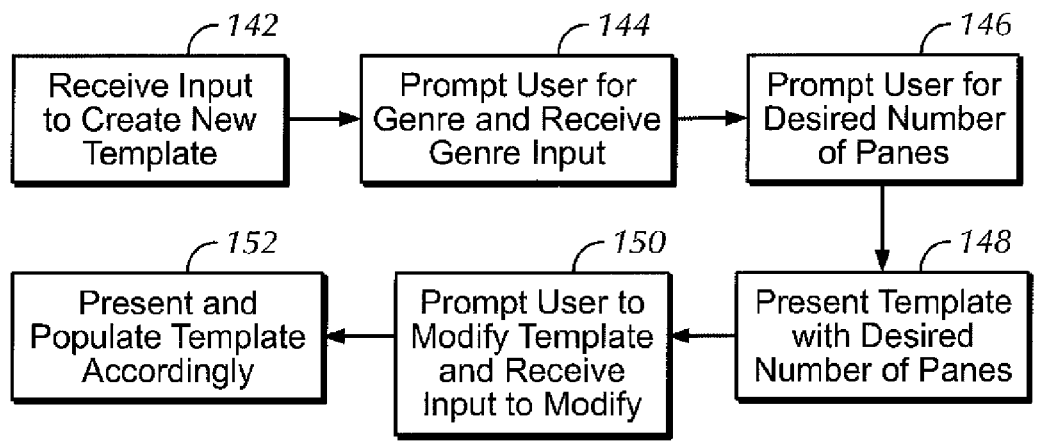
FIG. 11
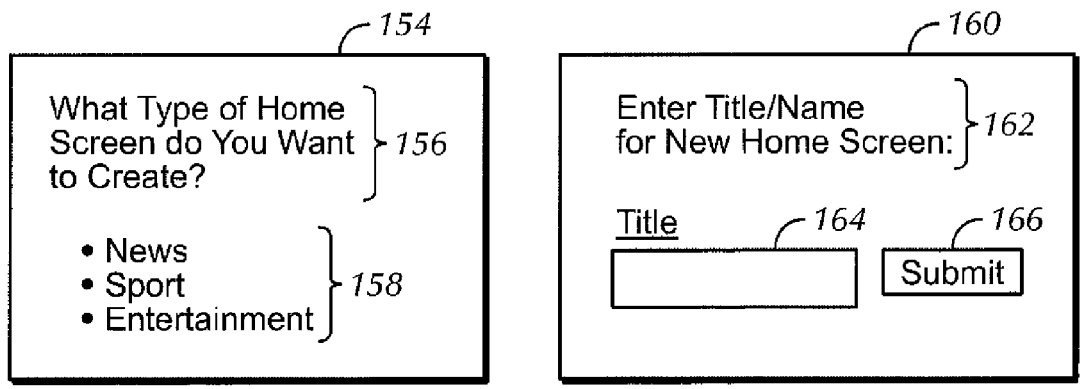
FIG. 12          FIG. 13

USER-DEFINED HOME SCREEN FOR ULTRA HIGH DEFINITION (UHD) TV

I. FIELD OF THE INVENTION

The present application relates generally to user-defined home screens for TVs, and in particular for ultra-high definition (UHD) TVs.

II. BACKGROUND OF THE INVENTION

High Definition (HD) displays have been introduced which have greater resolution than standard definition (SD) displays. This is achieved by increasing the pixel density from the standard 640 or 720 pixels per line, with 480 lines (720×480), to the HD 1920×1080 (for progressive and interlaced scans) 1440×1080 (for older interlaced scans). The greater resolution produces a clearer, more detailed visual presentation.

Recently, ultra high definition (UHD) displays have been introduced with even greater resolution than HD. As understood herein, the resolution of these displays lends itself to enhanced user experiences.

SUMMARY OF THE INVENTION

As understood herein, with larger screens and greater resolution, multiple panes of content may be presented simultaneously on a UHD display with the content in each pane retaining crispness even when decimated to a smaller size, with the large real estate of such displays affording an excellent canvas to present informational screens, application widgets, and so on. As also understood herein, however, multiple panes may overwhelm some viewers but not others. Accordingly, present principles understand the desirability of enabling a viewer to tailor his or her own multi-pane screen easily and intuitively.

Accordingly, in one aspect an audio video device (AVD) includes a display and a processor configured for controlling the display to present plural templates selectable by a user to establish a home screen layout. Each template includes plural content panes arranged in respective layouts, where audio video (AV) content is presentable in at least some panes of each template. Furthermore, the processor is configured for causing the display to present a user-selected template responsive to user selection of a first key on an input device.

In some embodiments, the input device may be, e.g., a TV remote commander (RC) configured for wirelessly communicating with the processor, and thus the first key may be a home key on the RC. Also in some embodiments, the AVD's display may be an ultra high definition (UHD) display such as, e.g., a "4K" display.

Moreover, the AVD's processor may be configured to present plural templates on the display simultaneously to enable a user to select at least one of the templates as a home screen template. If desired the processor may also be configured for communicating with a computer such as, e.g., a tablet computer to receive template modification signals from the tablet computer so that the AVD's processor may thus modify a user-selected template responsive to the template modification signals from the computer. Examples of template modification signals that can configure the processor to modify the template are signals that configure the processor to re-size a pane on a template and signals that configure the processor to add and/or delete a pane from a template.

In addition to the foregoing, if desired the processor may be configured to present one and only one template on the display at a time. The processor may thus be configured to sequentially present additional templates on the display responsive to a user scroll command, and/or may be configured to sequentially present additional templates on the display responsive to an elapse of a timeout period during which no user input is received.

Also if desired, in some embodiments the processor may be configured to fill panes of a user-selected template with user-selected content, and/or to fill panes of a user-selected template with content that is not defined by a user (e.g., selected automatically by the AVD processor). Also in some embodiments, the processor may be configured to enable a user to select first and second templates as first and second home screens respectively representing first and second content genres. Thus, if desired, the processor may be configured to, upon selection of the home key, present the first home screen responsive to a determination that the AVD is presenting the first genre and to present the second home screen responsive to a determination that the AVD is presenting the second genre.

In another aspect, a method includes presenting plural multi-pane templates on a display of an audio video device (AVD) and receiving a user selection of at least a first one of the templates. The method also includes modifying the first template responsive to user modification signals, populating panes of the first template with content, and subsequently presenting the first template responsive to a user invocation signal.

In still another aspect, a first audio video device (AVD) includes a display and a processor configured for controlling the display to present at least a first home screen and a second home screen on the display. Furthermore, the processor is configured to receive input useful for identifying a user of the first AVD and present either the first home screen or the second home screen based on the input.

The details of the present invention, both as to its structure and operation, can best be understood in reference to the accompanying drawings, in which like reference numerals refer to like parts, and in which:

BRIEF DESCRIPTION OF THE DRAWINGS

FIGS. 7-11 are exemplary flow charts of logic that may be executed in accordance with present principles;

FIGS. 12-21 are exemplary user interfaces (UIs) that may be presented on an UHD TV in accordance with present principles.

DETAILED DESCRIPTION OF THE PREFERRED EMBODIMENT

Figure 1:
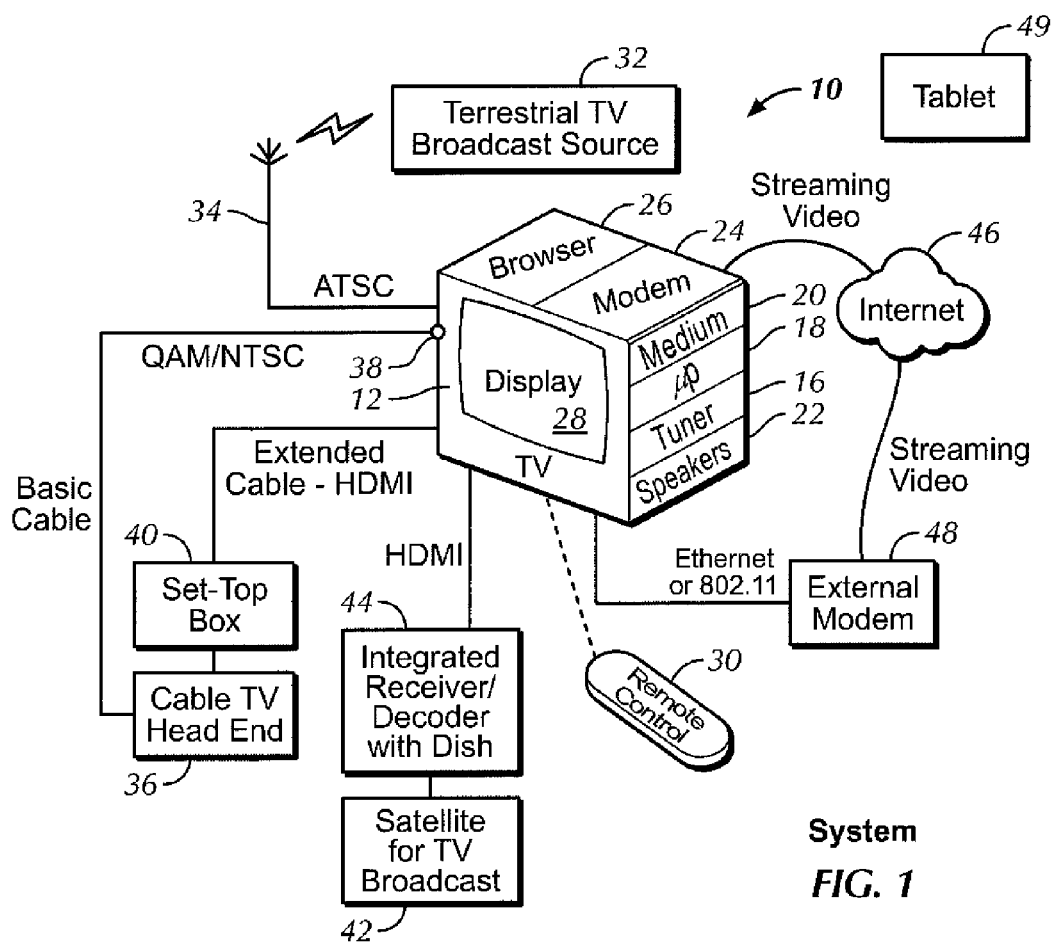
FIG. 1 is a block diagram of a non-limiting example system in accordance with present principles.

Referring initially to the non-limiting example embodiment show in FIG. 1, a system 10 includes an audio video device (AVD) such as a TV 12 including a TV tuner 16 communicating with a TV processor 18 accessing a tangible computer readable storage medium 20 such as disk-based or solid state storage. While the example AVD is embodied as a TV, present principles apply to other AVDs as well, e.g., home theaters, game consoles, computing devices, etc.

The TV 12 can output audio on one or more speakers 22. The TV 12 can receive streaming video from the Internet using a built-in wired or wireless modem 24 communicating with the processor 12 which may execute a software-implemented browser 26. Video is presented tinder control of the TV processor 18 on a TV display 28. In the example shown the display 28 is a 2160p (progressive scan) display with a resolution of 3840×2160 pixels (for 4K UHD) or 4320p (progressive scan) display with a resolution of 7860×4320 pixels (for 8K UHD). Frame rates for the UHD display 28 can be 24, 25, 50, 60, or 120 frames per second.

User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

Figure 2:
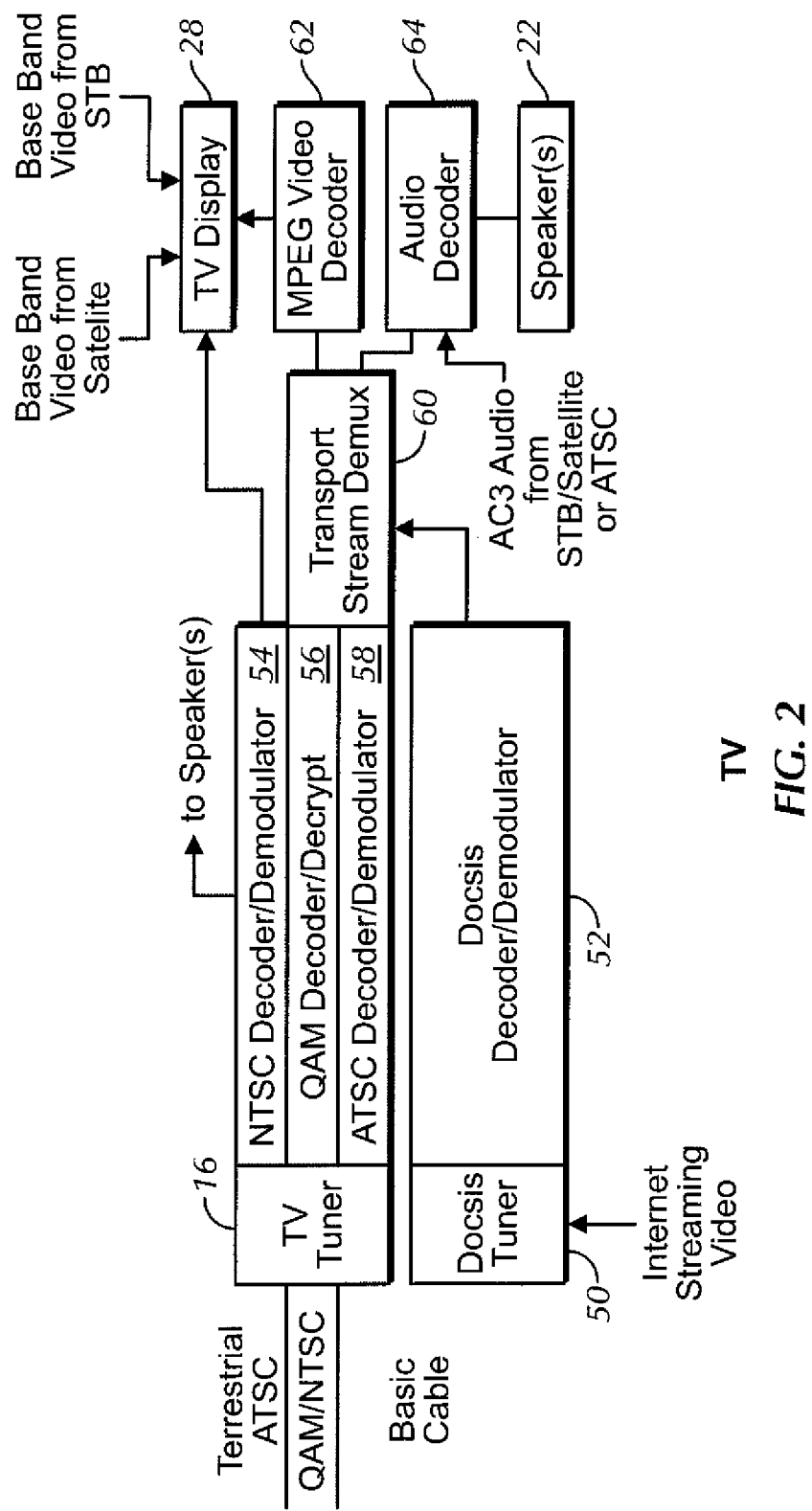
FIG. 2 is a block diagram of an example TV.

Before moving to FIG. 2, also note that a tablet computer 49 is shown in FIG. 1. The tablet computer 49 will be described in more detail in reference to FIG. 3.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3 that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Figure 3:
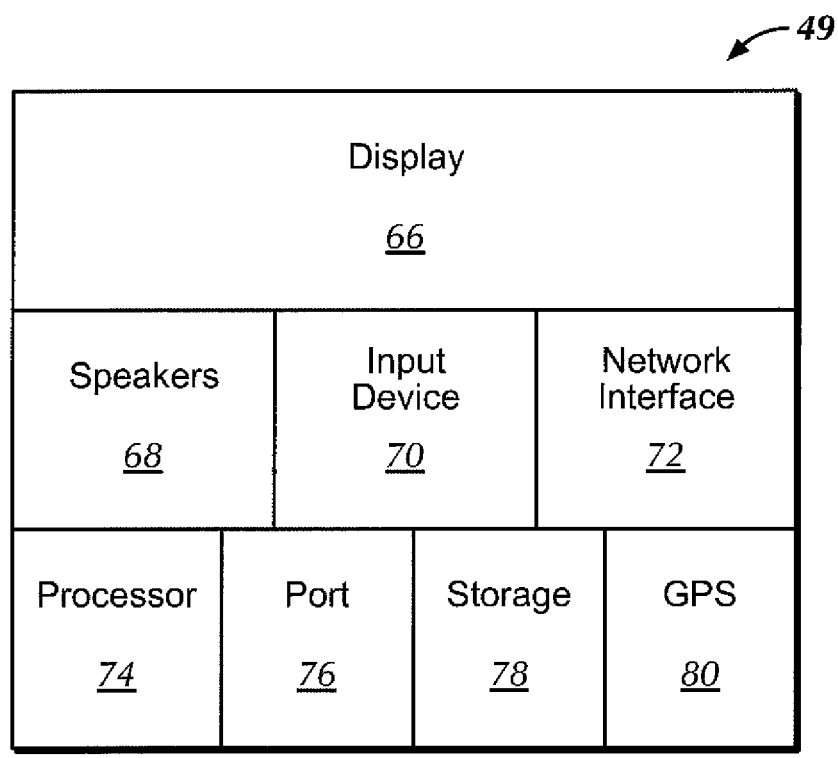
FIG. 3 is a block diagram of an example tablet computer.

Now in reference to FIG. 3, the tablet computer 49 described above is shown. The tablet computer 49 is understood to be operable to undertake present principles as described further below. However, it is to be further understood that devices other than a tablet computer, such as other portable and/or personal electronic devices, may be used to undertake present principles and may have some or all of the components included in the tablet computer 49 as described below. For instance, other devices that may be used are, e.g., smart phones, music players, smart watches, personal digital assistants (PDAs), laptop and desktop computers, e-readers such as electronic books, and indeed other televisions including Internet-enabled and smart TVs, mini TVs, etc.

Describing FIG. 3 with more specificity, it includes a touch enabled display 66, one or more speakers 68 for outputting audio, and an additional input device 70 such as, e.g., a track pad or an audio receiver/microphone for receiving voice commands and input. The tablet computer 49 also includes a network interface 72 for communication over at least one network such as the Internet 46, an WAN, an LAN, etc. under control of a processor 74, it being understood that the processor 74 controls the tablet computer 49 including, e.g., the display 66 to present images and the speakers 68 to present audio. The network interface 72 may be, e.g., a wired or wireless modem or router, or other appropriate interface such as, e.g., a wireless telephony transceiver. In addition, the tablet computer 49 includes an input port 76 such as, e.g., a USB port, and a tangible computer readable storage medium 78 such as disk-based or solid state storage. Moreover, a GPS receiver 80 is included on the tablet computer 49 and is configured to receive geographic position information from at least one satellite and provide the information to the processor 74, though it is to be understood that another suitable position receiver other than a GPS receiver may be used in accordance with present principles.

Figure 4:
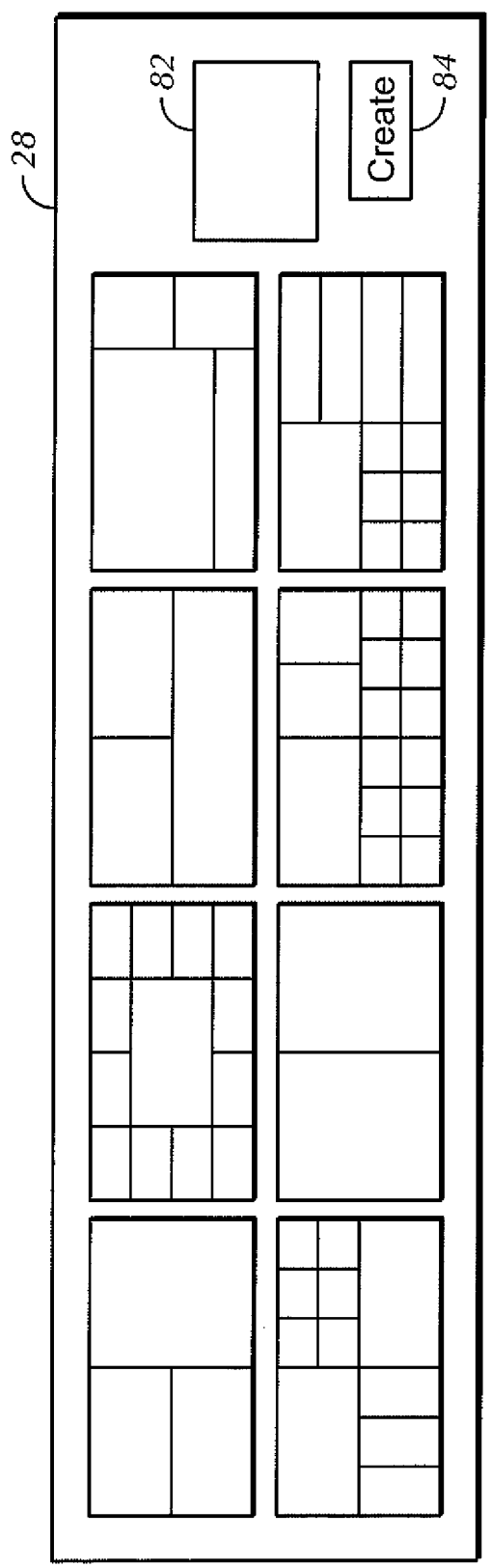
FIG. 4 is a schematic diagram of a UHD display presenting multiple multi-pane templates simultaneously.

Continuing the detailed description in reference to FIG. 4, it is to be understood that with larger screens and greater resolution such as high-definition and ultra high-definition displays, multiple panes of content may be presented simultaneously on the display with content that is presented in each pane retaining crispness and desirably clarity even when decimated to a smaller size, with the relatively large screen size area of such displays affording an excellent canvas to present informational screens, applications ("apps"), app widgets, electronic programming guides (EPGs) and associated information, and/or multiple content feeds (e.g., multiple channels, picture in picture, etc.), and so on. Present principles also recognize the desirability of enabling a viewer to tailor his or her own multi-pane screen easily and intuitively.

Accordingly, FIG. 4 shows an exemplary schematic diagram of a display (that may be, e.g., a UHD "4k" display manufactured by Sony Corporation) presenting multiple multi-pane templates simultaneously for selection by a user to create a screen that includes multiple panes of content, apps, app widgets, etc. This screen that includes multiple panes may in some embodiments be referred to as a "home" screen.

However, even though FIG. 4 shows plural templates presented simultaneously, it is to be understood that in other embodiments only a single template at a time may be presented such that templates may be scrolled through sequentially responsive to user scroll commands, and/or automatically based on a lapse of time. Such templates presented one-at-a-time will be described further below in reference to, e.g., FIGS. 6 and 7.

Regardless, the exemplary embodiment of FIG. 4 shows that the UHD display 28 described above presents, e.g., eight selectable templates 81 under control of the processor 18 while in, e.g., a template/pane setup mode, along with a blank template 82. First describing the templates 81, it may be appreciated that the templates 81 may present different numbers and sizes of panes. From left to right, top to bottom, the exemplary templates shown are arranged as follows:

(1) Two relatively smaller panes on the left with a third relatively larger pane occupying the right;

(2) Two relatively larger panes at top left and bottom right corners of the screen and six equal size square panes in the top right with three equal size rectangular panes in the bottom left (it being understood that other shapes such as circles or ovals may also be used for the panes in accordance with present principles);

(3) A relatively larger central pane with plural panes around it forming a border around the central pane;

(4) Two equally sized panes sharing the screen left to right (it being understood panes may split the screen top to bottom as well);

(5) A relatively larger pane on a bottom portion of the screen with two relatively smaller panes on the top portion of the screen;

(6) A relatively larger pane on a top left portion of the screen, two rectangular panes at a top right portion of the screen, and plural square panes occupying the lower portion of the screen;

(7) A relatively larger pane occupying a majority of the screen, a lower left pane of the same width of as the larger pane, and two panes on a right-most portion of the screen; and (8) A relatively larger pane on a top left portion of the screen, six square panes on a bottom left portion of the screen, and four rectangular panes on the right portion of the display.

Furthermore, it is to be understood that the panes shown in FIG. 4 may be rearranged on any of the templates as desired. It is to be further understood that still other configurations of panes may be used in accordance with present principles, such as, e.g., four equally-sized squares presented on the display, one relatively large pane on the left with two rows of smaller panes on the right above which is an EPG in another pane, etc.

Further still, it is to be understood that the relatively larger panes described above may present a channel to which the TV is currently tuned once the setup described herein is complete, or while setup is ongoing. Nonetheless, present principles also recognize that any of the other panes that are relatively smaller than the largest pane on any given template may also or instead show the currently tuned channel.

Still in reference to FIG. 4, also shown is a blank template 82 which may be selected using an input device such as the RC described above by, e.g., highlighting it with a cursor by manipulating a directional pad and then pressing a "select" button on the RC, and/or may be selected by, e.g., highlighting it and then selecting the create selector 84 also shown. Creating a new template that is not based on a predefined one such as those described above will be described in further detail later.

Figure 5:
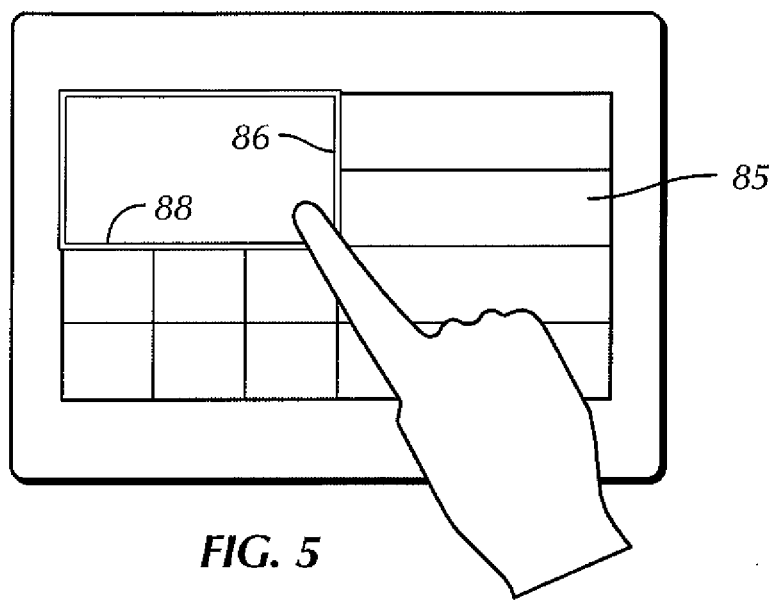
FIGS. 5 and 6 are schematic views of a UHD display showing how a viewer may modify a selected template using a tablet computer with a touch screen.
Figure 6:
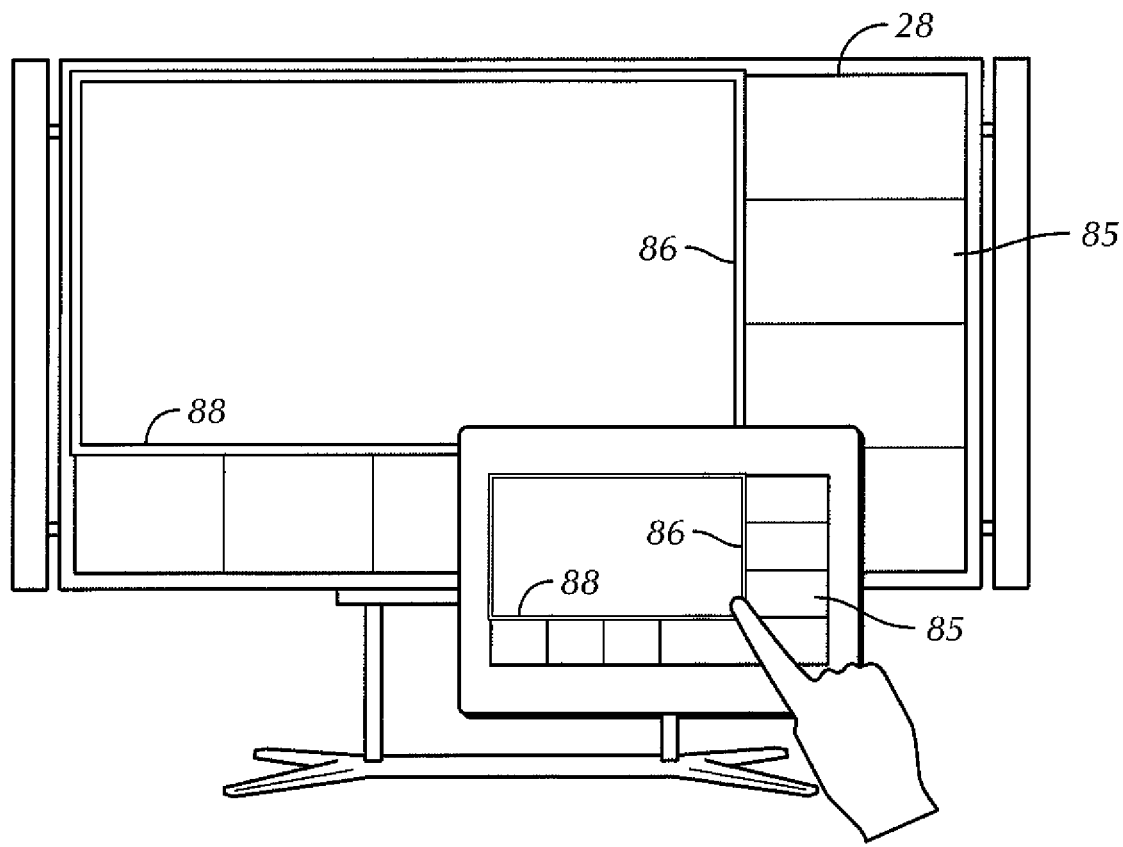

But first, reference is now made to FIGS. 5 and 6, which are schematic views of a UHD display such as the display 28, show an example of how a viewer may modify a selected (e.g., predefined) template 85 using a tablet computer or smartphone with a touch screen, such as the tablet 49 described above. Accordingly, FIGS. 5 and 6 are understood to show a template selected for modification as presented on a tablet computer, with modifications entered at the tablet computer being reflected on the selected template as also presented on the UHD display 28 of the TV 10 through, e.g., wireless communication between the tablet computer 49 and TV 10 via, e.g., the Internet and/or a LAN.

As shown in FIG. 4, a user provides input to the touch-enabled display 66 using an index finger. Input may be entered at a portion of the screen, e.g., presenting a corner of a pane 86, and/or anywhere in the pane 86 itself to select the pane for modification. Once selected, the pane 86 may be highlighted as shown by a border 88, thereby indicating that the pane 86 is the pane from the template that has been selected for modification.

As may be appreciated from FIG. 5, a user may then modify the pane once selected by, e.g., enlarging/resizing the pane. This may be done, for instance, by touching a corner of the pane as presented on the touch screen and then dragging it diagonally away from the center of the pane to thereby enlarge both the height and/or width of the pane. Other input that may resize the pane may include, e.g., tapping with one finger to enlarge or reduce the size of the pane while tapping with two fingers does the opposite (either enlarging the size if the one-finger tape reduced the size, or reducing the size if the one-finger tap enlarged the size).

Still other input may be used in accordance with present principles. For instance, a remote control may be used in the conjunction with the tablet computer 49 to modify the template so that, e.g., once the pane desired to be modified has been selected, e.g. arrow selectors, plus and minus selectors, volume up/down, and/or channel up/down selectors on the RC may be used to incrementally enlarge or reduce the size of the selected pane. Further still, in addition to or in lieu of the foregoing, selectors may be superimposed onto a portion of the tablet and/or TV screen, where the selectors may be, e.g., plus and minus symbols that when selected cause the selected pane to either be enlarged if the plus symbol is selected or reduced if the minus symbol is selected.

Figure 7:
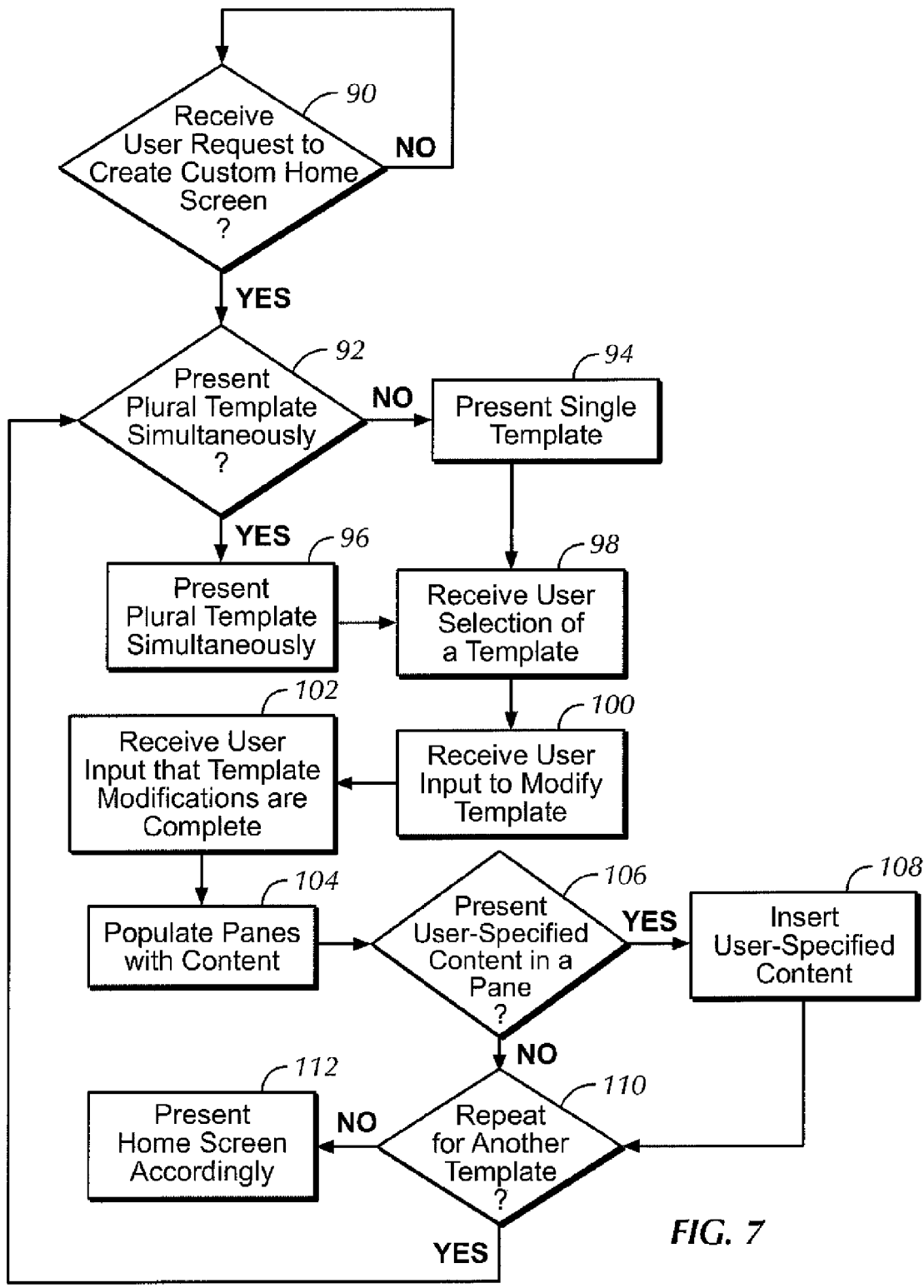

Moving on, reference is now made to FIG. 7, which is an exemplary flow chart of logic that may be executed by a processor associated with an UHD TV to undertake present principles. The logic begins at decision diamond 90, where the logic determines whether a request has been received by a user/viewer of the UHD TV to create a customized home screen. If a negative determination is made, the logic may repeat until such time as an affirmative determination is made.

Once such an affirmative determination is made at diamond 90, the logic then moves to decision diamond 92 where the logic determines whether to simultaneously present more than one multi-pane template on the TV's display at one time. This determination may be made based on, e.g., input (e.g., previously) received from a user indicating the desire to have plural templates simultaneously presented, based on a default settings (e.g., the default is presenting plural templates simultaneously, although it is to be understood present principles recognize the default may be to present only a single template at one time), based on trends determined by the TV's processor based on past home screen creations, etc. Regardless, a negative determination at diamond 92 causes the logic to move to block 94 where only a single template is presented, while a positive determination at diamond 92 causes the logic to instead move to block 96 where plural templates are presented simultaneously on the display.

Then, after either block 94 or block 96, the logic moves to block 98 where the logic receives a user selection of one of the templates. Thereafter, at block 100 the logic receives input from the user to modify the selected template as described herein and then modifies the template accordingly (e.g., responsive to receiving the input). The logic then proceeds to block 102 where the logic receives input from the user indicating that the desired modifications are complete (e.g., by selecting a "finish" selector presented on the TV or a tablet computer being used to modify the template).

After block 102 the logic proceeds to block 104 where at least one, and in some embodiments all, panes of the modified template are populated with content, apps, EPGs and EPG data, etc. Thereafter, the logic determines at decision diamond 106 whether input has been received indicating that the user desires specific and/or different content be presented in one or more of the panes, rather than the content that was automatically populated by the logic at block 104. If a negative determination is made at diamond 106, the logic moves directly to decision diamond 110. However, block 108 will be described first, which is reached by the logic based on a positive determination being made at diamond 106.

At block 108, the logic receives input from the user indicating particular, user-specified content (or apps, app widgets, etc. as described above) to be presented in at least one of the panes (and/or specifying the particular pane in which to present the desired content is to be placed) and then populates the one or more panes with that content accordingly (e.g., responsive to receiving the input/content selection). After block 108, the logic moves to diamond 110 where the logic determines whether input has been received from the user indicating that the user desires to create another "home screen" by, e.g., repeating the logic of FIG. 7. Based on an affirmative determination at diamond 110, the logic may revert back to decision diamond 92 and proceed from there. Otherwise, the logic instead moves to block 112 where it presents the modified template with content, etc. in the panes (e.g., responsive to a user invocation signal) as created/modified using the logic just described.

Before moving on to the next figure, it is to be understood based on the foregoing that some or all of the panes may be populated with user-specified content, while other panes may remain blank/unpopulated and/or be populated automatically by the processor. Furthermore, in exemplary embodiments, content (and/or, e.g., apps, EPG data, etc.) automatically populated to one or more panes of a user-selected "home screen" template may pertain to a particular class of content and/or genre. Thus, the TV's processor may determine that, and/or receive input that, content of a particular genre should populate at least one, or all, of the panes. Such genres may be, e.g., sports, news, weather, entertainment (e.g., movies), music, drama, suspense, horror etc. If a genre is determined (e.g., automatically) by the processor, the processor may identify content as being associated with that genre based on, e.g., EPG information, data, and/or metadata, based on a user's (e.g., previous) classifications/indications received by the processor for various pieces of content. Note that a piece of content, channel, app., etc. may be associated with more than one genre.

Figure 8:
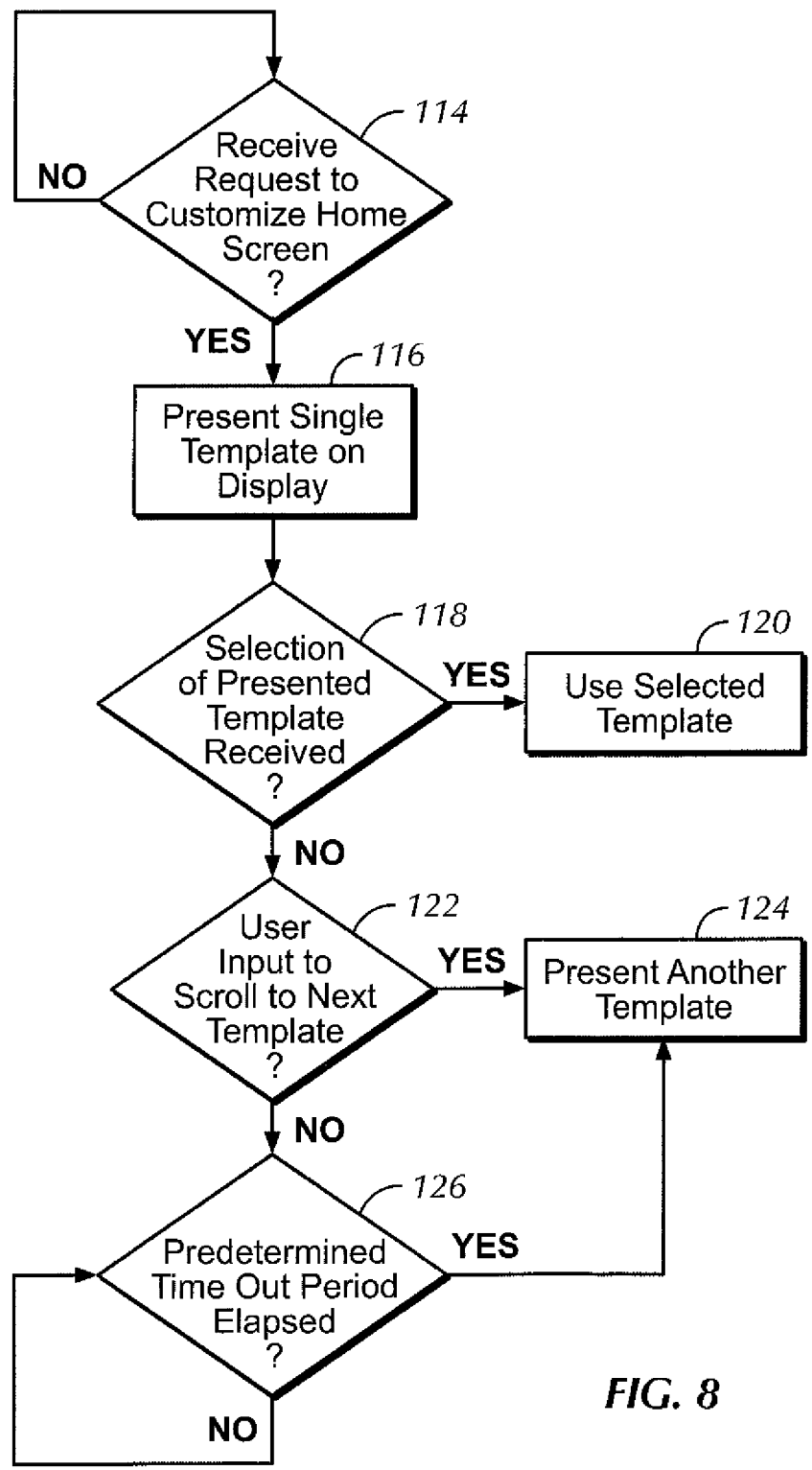

Now in reference to FIG. 8 and as mentioned above, in some embodiments when creating a "home screen" based on a template, rather than presenting plural templates on the display simultaneously from which a user may select one to create the home screen, one and only one template may be presented on the display at a time. In such embodiments, the TV's processor (and/or, e.g., a tablet computer processor receiving input from a user and operating in conjunction with the TV processor as described herein) may be configured to sequentially present additional templates on the display responsive to, e.g., a user scroll command and/or an elapse of a timeout period during which user input is not received. FIG. 8 thus shows an exemplary logic flow for presenting one and only one template on a TV display at one time.

Accordingly, the exemplary logic of FIG. 8 begins at decision diamond 114 where the logic determines whether a request has been received by a user/viewer of an UHD TV to create a customized home screen. If a negative determination is made, the logic may repeat until such time as an affirmative determination is made.

Once such an affirmative determination is made at diamond 114, the logic then moves to block 116 where the logic presents a single template on the TV's display for selection by a user. The logic then moves to decision diamond 118 where the logic determines whether the single template that has been presented has been selected by the user as the template to be used to create a home screen in accordance with the principles set forth herein. If an affirmative determination is made at diamond 118, the logic proceeds to block 120 where the selected template is used to create a home screen. In non-limiting embodiments, although not shown in FIG. 8, the logic may then proceed from, e.g., block 100 of FIG. 7 after block 120.

Regardless, should a negative determination be made at diamond 118, the logic instead moves to decision diamond 122 where the logic determines whether user input to scroll to another template has been received. If an affirmative determination is made at diamond 122, the logic proceeds to block 124 where the logic presents another template on the TV's display. If, however, a negative determination is made at diamond 122, the logic instead moves to decision diamond 126 where the logic determines whether a predetermined and/or predefined period of time and/or timeout period has elapsed during which user input has not been received.

If a negative determination is made at diamond 126, the logic may continue making the determination at diamond 126 until such time as an affirmative determination is made. Once an affirmative determination is made at diamond 126, the logic moves to block 124 where the logic presents another template on the TV's display.

It is to be understood that, in accordance with present principles, the logic of FIG. 8 may present the preset, predefined, and/or pre-stored templates singularly on the TV's display at random, and/or based on a predefined sequence (e.g., determined by the TV manufacturer or the user/consumer). The templates may be similar to those shown in FIG. 4.

Figure 9:
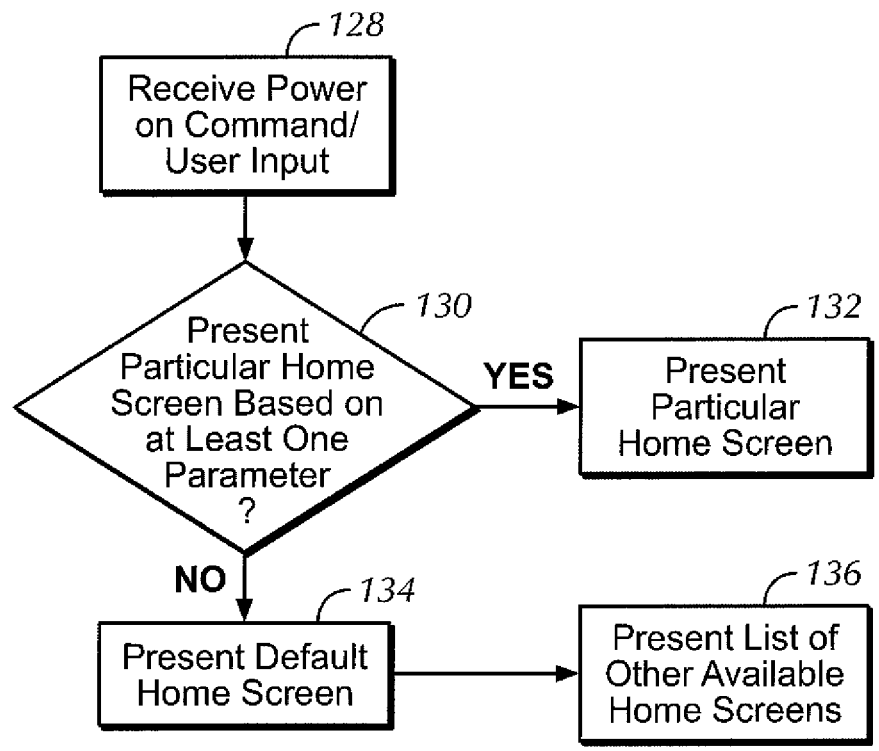

Moving on to FIG. 9, exemplary logic to be undertaken by a TV processor for determining a home screen to be presented in response to a TV power-on and/or user selection of, e.g., a home key on a remote commander in accordance with present principles is shown. Beginning at block 128, the logic receives a power on command to power on the TV, and/or receives user input to cause the processor to present a home screen (e.g., by selecting a "home" key, "menu" key, etc. on an RC, or selecting a selector element on another device such as a tablet computer in wireless communication with the TV to provide input and commands thereto). After block 128, the logic moves to decision diamond 130.

At decision diamond 130, the logic determines whether a particular home screen that may have been, e.g., previously created by a user of the TV prior to the command/input received at block 128 should be presented in response to the command/input received at block 128. The determination performed at diamond 130 may be based on one or more parameters, such as the time of day, or day of the week (e.g., if the user previously programmed the TV to present a certain home screen at a particular time of day such as a sports home screen in the morning and news home screen at night). Examples of other parameters include the genre of the channel to which the TV was tuned prior to being powered off, the genre of the channel presented immediately upon power on, and/or the genre of the channel being currently presented at the time the user input was received at block 128. One or more of the foregoing parameters may be used by the processor to thus present a home screen associated with the same genre.

However, still other ways of determining which home screen to present at, e.g., TV power on are understood to be encompassed by present principles. There may be a "default" genre or home screen that may have been set by the user or manufacturer, for instance. Still other parameters may be used in addition to or in lieu of the foregoing, such as determining a home screen to present based on one or more home screens being associated with a particular user that has logged in or otherwise identified himself or herself to the TV.

In addition to or in lieu of the foregoing, a camera on or associated with the TV, RC, tablet computer, smartphone, etc. may gather at least one image of the user and, using user-recognition technology (e.g., facial recognition, user height and weight characteristics/recognition, mannerism recognition, recognition of gestures in free space identifying the user and/or entering commands to control any of the input for the TVs/tablets/RCs disclosed herein, etc.) may thus be used in conjunction with the processor to identify a user and then determine one or more home screens to be presented that are associated with the user. Examples of still further parameters are ones based on voice recognition and/or voice control entering commands to control any of the input for the TVs/tablets/RCs disclosed herein, and fingerprint recognition of fingerprint data gathered through a reader located on, e.g., the RC or tablet computer, and similarly palm print/hand print recognition, etc.

As yet another example, the determination of diamond 130 may be based on the identity of a viewer as determined or otherwise recognized by the TV processor based on another device associated with a user being present and/or within a predefined area or radius of the TV. Thus, for instance, a user's smartphone, laptop computer, tablet computer, etc. may be in communication with the TV over a network such as a protected home WiFi network such that, e.g., the device merely being present, active, and/or connected to the network allows the TV processor to recognize and/or identify it. Furthermore, it may be the case that the TV processor has (e.g., previously) associated the other device (smartphone or tablet computer) as being associated with at least one user of the TV, and thus at diamond 130 the logic may receive input indicating that the other device is present on the network to thereby determine one or more home screens associated with that user to present. Present principles also recognize that still other ways of determining that another device associated with a particular user is within a predefined area or radius of the TV to thereby determine a home screen to present may be used, such as receipt of input including GPS coordinates of the other device (e.g., from the GPS receiver 80 of the tablet computer 49) to thus determine that a particular viewer is nearby and/or viewing the TV.

Either way, based on an affirmative decision diamond 130 of FIG. 9, the logic proceeds to block 132 where the logic presents at least one home screen according to one or more of the parameters discussed above. If, however, a negative determination is made at diamond 130, the logic instead moves to block 134 where the logic presents at least one default home screen, it being understood that the default home screen may be predefined and/or preset, and/or may be determined by the TV manufacturer. Subsequent to block 134, the logic moves to block 136 where the logic may optionally present a listing of other available home screens in addition to presenting the default home screen. The listing may be, e.g., overlaid on the default home screen, and/or may be included in one of the panes of the default home screen.

However, in addition to or in lieu of using position information received by a second device associated with the user, present principles recognize that still other ways for manipulating the TV and its one or more home screens may be executed using a second device. For instance, an app on the user's smart phone that is associated with and/or wirelessly linked to the TV may be launched to manipulate the TV and command the TV to present a particular home screen.

Accordingly, it may be appreciated based on the foregoing that a TV processor may be configured, and furthermore methods are disclosed herein, for enabling a user to select first and second templates as first and second home screens respectively representing first and second content genres such that either the first or second home screen may be presented responsive to user manipulation of an input element such as a "home" key on a RC and also responsive to a determination that the AVD is presenting the first or second genus, respectively.

Figure 10:
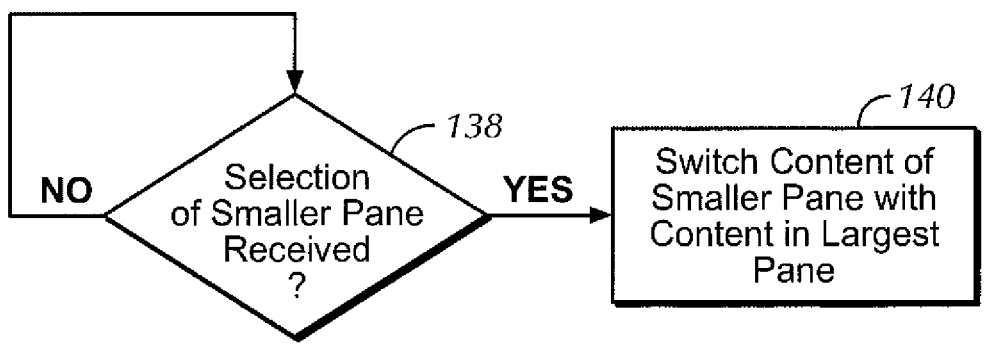

Continuing the detailed description in reference to FIG. 10, it is a flow chart of exemplary logic for presenting content from a relatively smaller pane of a home screen in a relatively larger "main" pane upon selection of the smaller pane and/or content presented thereon. The logic begins at decision diamond 138 where the logic determines whether a relatively smaller pane presenting content, an app, EPG data, etc. has been selected (e.g., using a RC to highlight the pane). If a negative determination is made, the logic may continue making the determination at diamond 138 until such time as an affirmative determination is made.

Once an affirmative determination is made at diamond 138, the logic proceeds to block 140 where the logic presents the content, app, and/or EPG data, etc. that was presented in the relatively smaller pane and presents it in another pane, such as the largest "main" pane of the home screen being presented on the TV. It is to be understood that in exemplary embodiments, the logic may switch content that was presented in the main pane prior to the selection of the relatively smaller pane such that the content previously presented in the relatively smaller pane is presented in the main pane while the content that was presented in the main pane is then presented in the relatively smaller pane that was selected.

However, in other embodiments, the content from the main pane may be presented in still another pane that was not being used to present content (e.g., blank), etc., or may cease to be presented anywhere on the home screen and/or TV display. In such an instance, the relatively smaller pane that was selected may continue presenting the same content, app, etc. such that two panes present the same thing, or alternatively the relatively smaller pane that was selected may be blank such that it does not present any content, app, etc. once that content, app., etc. is switched to the main pane. Furthermore, present principles recognize that, if desired, once content from any pane is selected for larger viewing (or, e.g., an app is selected from a pane to thus launch the app), the home screen may be removed from the TV display such that only the content (or app) is presented (e.g., on the entire screen until a "home" RC selector is selected again).

In addition, present principles recognize that still other ways for switching content from one panel to another may be used. For instance, a "drag and drop" feature may be used, e.g., in conjunction with a tablet computer such that content presented in one pane may be drug into any other pane for presentation thereon. Also, a sequence of pane selections may be used to move content from one pane to another (e.g., based on a prompt to select the pane with the desired content, and then based on the first pane selection, a second prompt to provide input identifying the pane to which the content should be moved).

Reference is now made to FIG. 11, which shows exemplary logic for creating a new home screen and/or template including one or more panes. The logic of FIG. 11 may be executed by a TV processor in accordance with present principles in response to, e.g., the blank template 82 being selected as described in reference to FIG. 4 above. FIG. 11 begins at block 142 where input from a user to create a new home screen and/or template is received. The logic then proceeds to block 144 where the logic prompts a user to provide input identifying at least one genre with which the user would like the new home screen to be associated, though it is to be understood that the new home screen may be "tagged" with plural genres such that any of the "tagged" genres may later cause the processor to identify the new home screen as being a candidate for presentation based on either genre. Regardless, it is to be understood that a user selection is also received at block 144 after the prompt is presented.

The logic then moves to block 146 where the logic prompts the user for input regarding the number of panes the user desires to be included on the new home screen, and at block 146 the logic also receives input regarding the same. Furthermore, if desired at block 146 the logic may also prompt the user for locations and/or configurations for the panes to be included in the new home screen. Either way, after block 146 the logic moves to block 148 where the logic presents a template according to the user input received at blocks 144 and 146.

Thereafter, the logic moves to block 150 where the logic prompts the user to modify the template, should the user desire to do so. Assuming the user does desire to do so (e.g., resize, delete, and/or move one or more of the panes), input for any such modifications is also received at block 150. The logic then concludes at block 152 where the logic presents a new home screen based on the template and populates it automatically and/or based on user input as described herein.

Moving on, FIGS. 12-21 are exemplary user interfaces (UN) that may be presented on a TV in accordance with present principles to create and/or modify a home screen (e.g., a UHD TV home screen). Beginning first with FIG. 12, a UI 154 is shown and includes text 156 asking a user what type/genre of home screen the user wishes to create. Thus, the UI 154 shows plural selectors 158 that may be, e.g., selectable links, for different genres such as news, sports, and entertainment.

FIG. 13 shows a UI 160 that includes text 162 prompting a user to enter a title or name to be associated with the home screen. The UI 160 therefore also shows a text entry box 164 for a user to enter a name or title, as well as a submit selector 166 to input the name to the TV processor.

Figure 14:
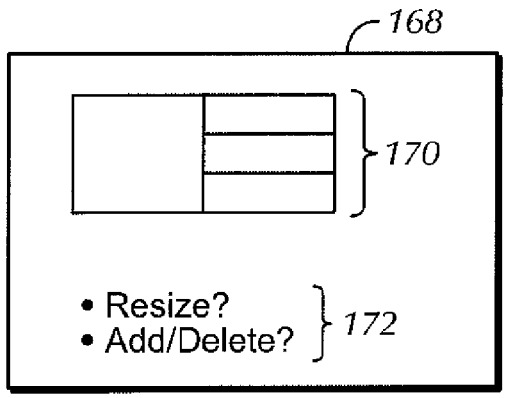
Figure 15:
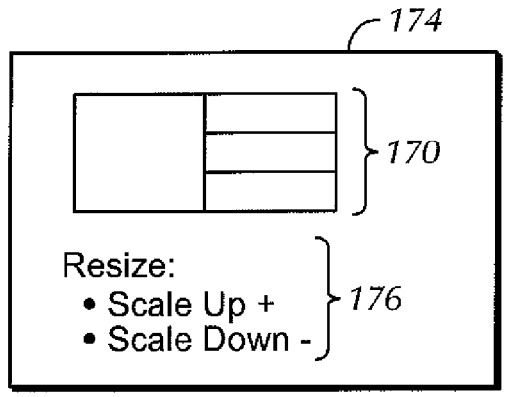
Figure 16:
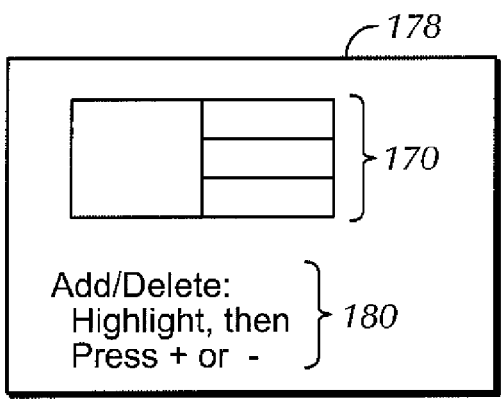

FIG. 14 shows a UI 168 for modifying a selected template 170 that may have either been selected or created as set forth above. The UI 168 may also include one or more selectable links 172 to modify the template 170, such as a resize selector or an add/delete selector. Should the resize selector be selected from the UI 168, the UI 174 of FIG. 15 may be presented. The UI 174 again shows the template 170 in its current form (e.g., based on any modifications that have been made, if any), as well as selectors 176 selectable for resizing one or more panes in accordance with present principles. Should an add/delete selector be selected from the UI 168, the UI 178 of FIG. 16 may be presented. The UI 178 shows the template 170 in its current form (e.g., based on any modifications that have been made, if any), as well as add and delete selectors 180 selectable for adding or deleting a pane in accordance with present principles.

It is to be understood that a user may provide input to the TV processor (or other device processor used to modify the template 170) indicating which pane is to be resized, added, or deleted prior to selecting one of the selectors 176, 180 by, e.g., using a RC to move a cursor to highlight a particular pane and/or using a tablet computer presenting a (e.g., modifiable) image of the template 170 thereon to wirelessly modify the template 170 from the tablet computer over a wireless network as set forth herein. However, it is to be further understood that still other ways for providing input to the TV processor and/or tablet processor for identifying the pane to be modified may be used in accordance with present principles.

Figure 17:
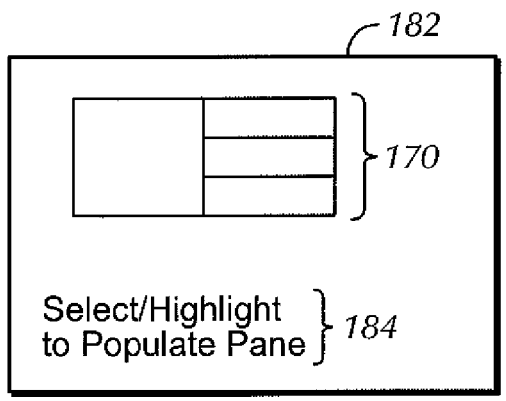

Moving on, FIG. 17 shows a UI 182 selecting, specifying, and/or highlighting a particular pane in order to populate the pane with, e.g., content or an app according to user preference. Thus, a select selector 184 may be selected once the pane from the template 170 to be populated is, e.g., highlighted or otherwise selected to thereby cause another UI to be presented for a user to specify, e.g., a particular piece of content with which to populate the selected pane, such as the UI 186 of FIG. 18.

Figure 18:
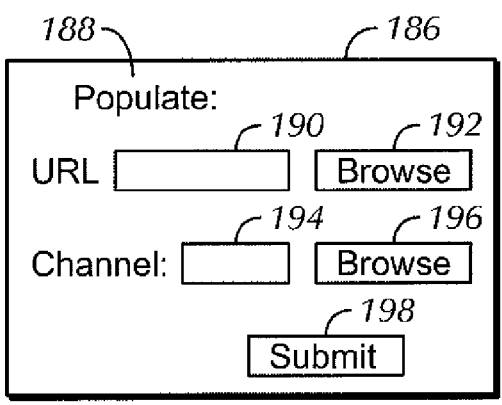
Figure 19:
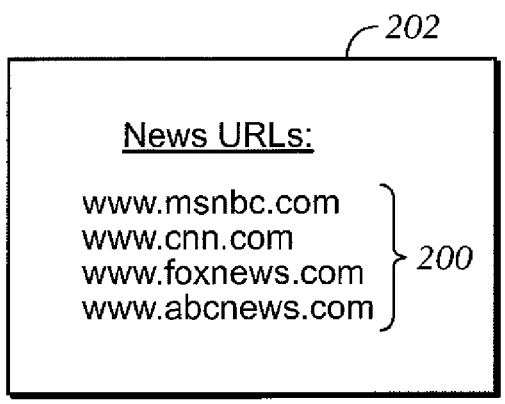

Accordingly, the UI 186 of FIG. 18 includes text 188 prompting a user to enter information regarding a piece of content with which to populate the selected pane. The UI 186 shows a URL text entry box 190 for a user to enter a URL associated with the desired content, as well as a browse selector 192 for a user to browse, e.g., a list of URLs (e.g., associated with a particular genre such as the one associated with the home screen being created), the Internet itself (e.g. using an Internet browser accessible to the TV and/or tablet computer), etc. to select the URL to include in the box 190.

Also shown on the UI 186 is a channel entry box 194 for a user to enter a desired TV, cable, satellite, etc. channel from which content is to presented in the selected pane, as well as a browse selector 196 to browse, e.g., an EPG or other channel list to locate a channel, which may then be selected and included in the box 194. A submit selector 198 is also shown such that once the desired content has been selected (e.g., entered into one or both of the boxes 190, 194), the content selection may be input to the TV processor to thereby populate the selected pane.

An example list 200 of URLs that may be presented on a UI 202 in response to, e.g., selection of the browse selector 192 described above is shown in FIG. 19. As may be appreciated from the list 200, the URLs all pertain to a particular genre (news). The news list 200 may have, e.g., been generated by the TV processor if the news genre for the home screen being created or modified has already input to the processor prior to presenting the UI 202. Regardless, it may be appreciated from FIG. 19 that the list 200 includes URLs to various websites providing news-related content.

Figure 20:
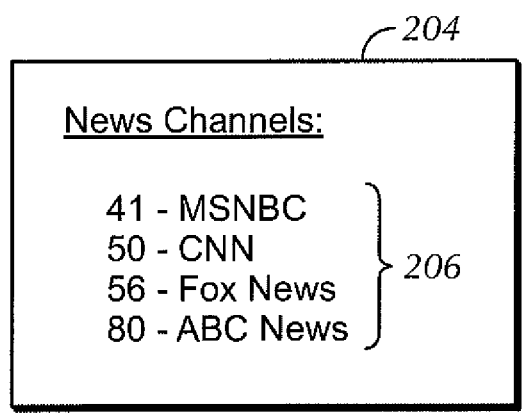

Moving on, FIG. 20 shows a UI 204 that includes an example list 206 of news content-providing television channels that may be presented, e.g., in response to selection of the browse selector 196 of FIG. 18 being selected. As may be appreciated from the list 206, the titles of the TV channels all pertain to a particular genre (news). The news list 206 may have, e.g., been generated by the TV processor if the news genre for the home screen being created or modified has already been input to the processor prior to presenting the UI 204. Regardless, it may be appreciated from FIG. 20 that the list 206 includes the channel number and channel title for various television channels that are at least currently providing news-related content.

Figure 21:
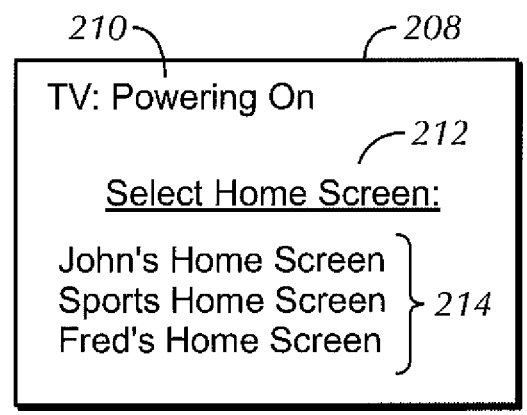
Figure 22:
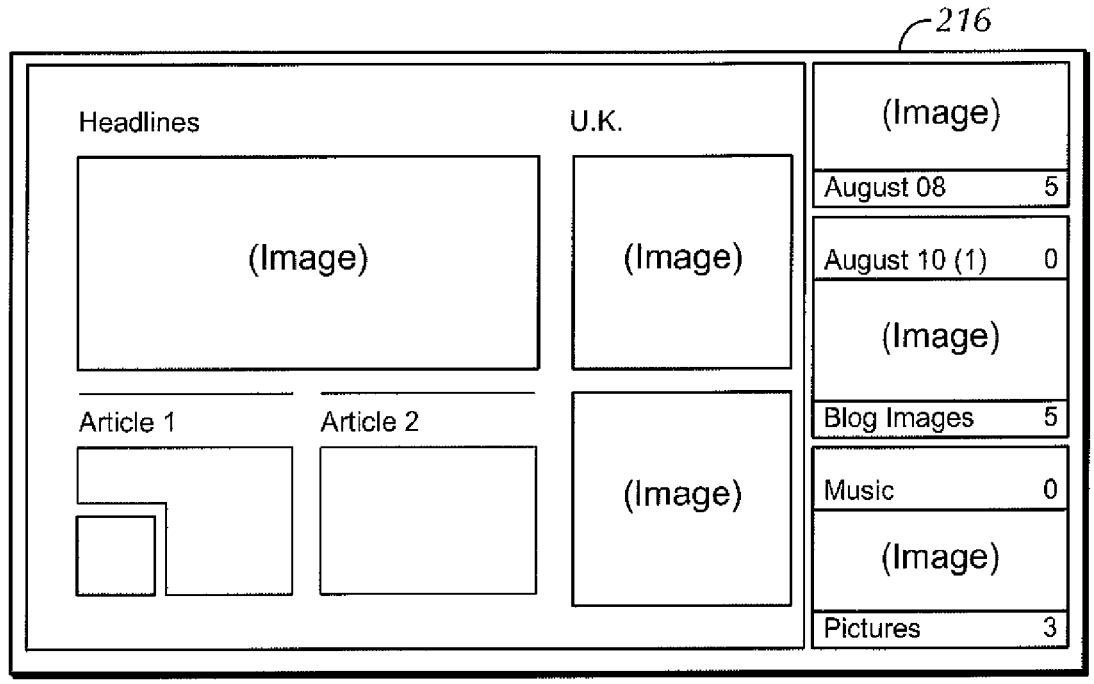
FIGS. 22-25 are exemplary home screens that may be presented on an UHD TV in accordance with present principles.

Now in reference to FIG. 21, an exemplary UI 208 that may be presented at, e.g., TV power on for selection of a home screen to present on an UHD TV is shown. Thus, the UI 208 includes an indication 210 that the TV is powering on or has powered on. The UI 208 also includes text 212 prompting a user to select at least one selector 214, each of the selectors 214 shown on the UI 208 being associated with a respective home screen. The selectors 214 may be for home screens created for, e.g., particular users and/or particular genres. Note that the UI 208 may also be presented in response to, e.g., a "push and hold" command entered by pressing and holding a key on an RC to thereby "call up" the UI 208 or any other overlay screen presenting information similar to that shown on the UI 208.

Continuing the detailed description in reference to FIGS. 22-25, these figures show exemplary home screens that may be presented in accordance with present principles. Thus, the exemplary home screen 216 shown in FIG. 22 includes news headlines related to sports and world news for a particular country (the United Kingdom), as well as panes containing content related to the current weather (e.g., as indicated by a webcam picture of an outside area), as well as a pane selectable to view images and select music to which to listen.

Figure 23:
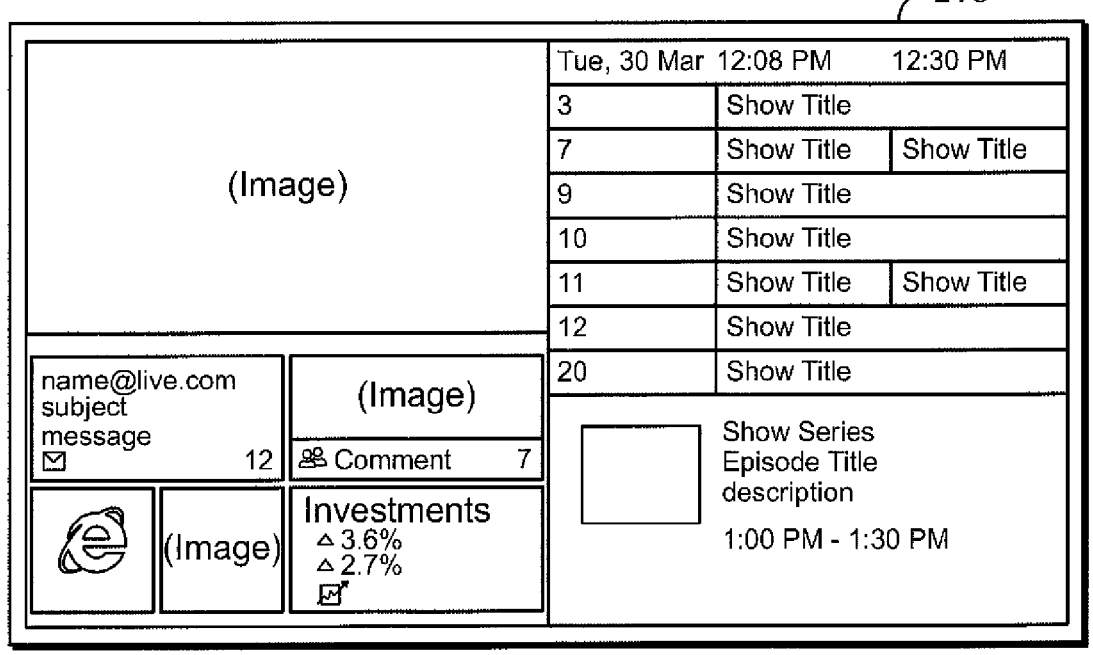
Figure 24:
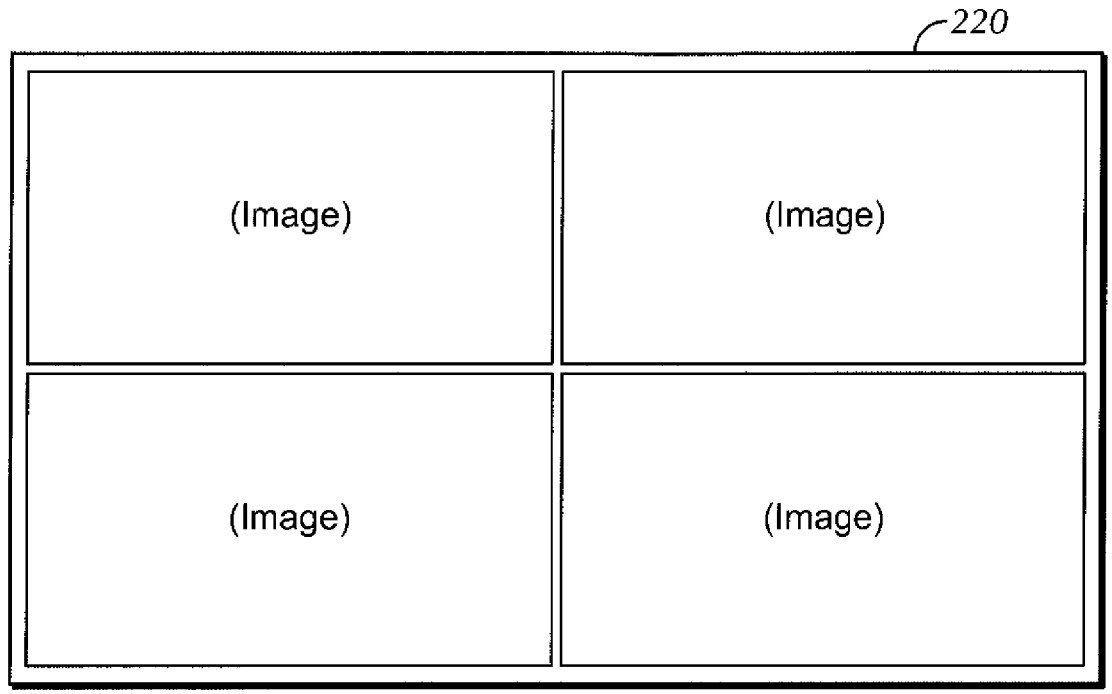
Figure 25:
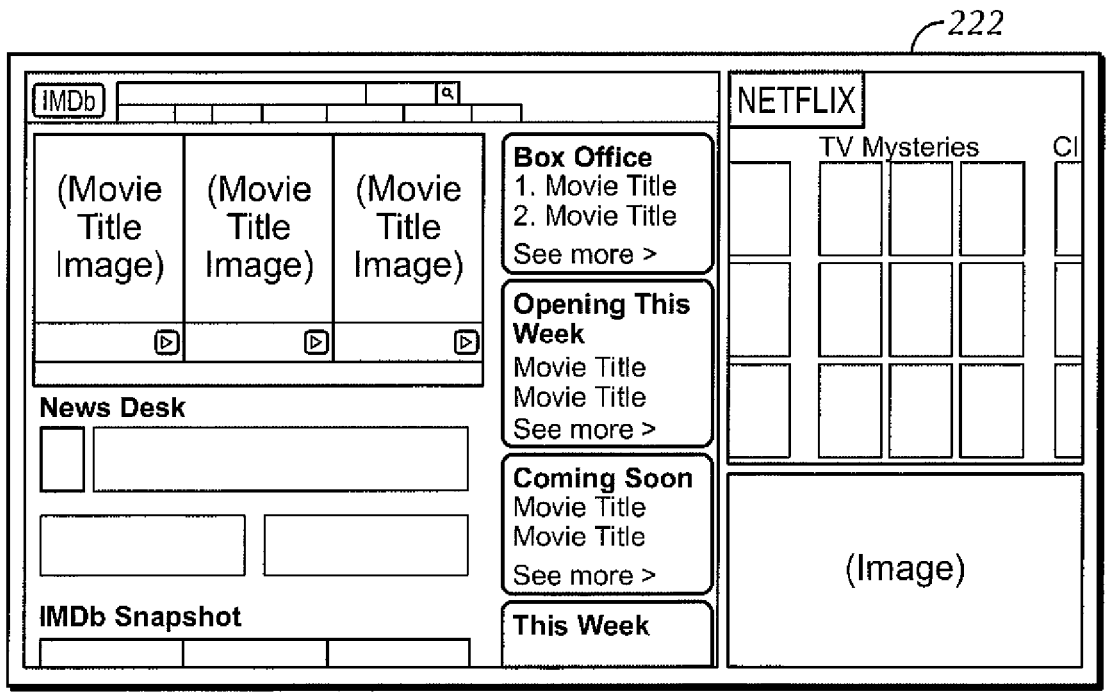

The exemplary home screen 218 shown in FIG. 23 includes a main pane presenting a live football game, as well as panes presenting content related to email/messages, internet browsers, icons, investment data, social networking applications, and an EPG (on the right). FIG. 24 shows another exemplary home screen 220, this time with four quadrants each presenting AV content from a different channel and/or URL. Last, FIG. 25 shows yet another exemplary home screen 222 presenting an Internet browser in a main pane, a movie streaming application in a top right pane, and television content in a bottom right pane.

It may now be appreciated based on the foregoing that customizable home screens for televisions such as HD TVs and UHD TVs may be created and modified, and that such home screens, and indeed differing home screens, may be presented based on various parameters using the same key on a remote control (such as a "home" key). Thus, for instance, each member of a household can create and use their own customized home screen (using, e.g., another mobile device such as a tablet computer or smart phone) when they are viewing the UHD TV that is tailored to the content they typically wish to view, and even then any one particular user may have more than one home screen associated with them that may be presented on an UHD TV. To reiterate, non-limiting genres include music, news, sports, entertainment, movies, comedy, drama, etc.

Present principles also recognize that being able to switch content between panes (e.g., switching content presented in a relatively smaller pane to being presented in a relatively larger pane or the "main" pane) allows a user to quickly toggle between pieces of content, apps, etc. Thus, a user may establish a customized home screen using, e.g., a setup "wizard" or program based on a preset template or templates (presented, e.g., as thumbnails on a TV screen), and/or based on "rolling" templates that may be horizontally or vertically scrolled through by presenting only a single thumbnail template at a time on the TV screen.

In addition to the foregoing, it is to be understood that panes and the home screen itself may be modified even after a customized home screen is initially set up. Thus, for instance, a pane may be deleted from a home screen that is presented at TV power on by, e.g., selecting a menu selector or "edit" selector presented on the home screen, or otherwise navigating to an edit function, which would then allow the user to navigate the home screen, e.g., with a cursor to provide input (e.g., via a "select" key) to thereby delete the highlighted pane. Furthermore, such "edit" functions to edit a customized template that was previously created may be navigated to and/or engaged in to edit any home screen previously created, as well as any "default" home screens provided by the TV manufacturer.

Present principles also recognize that, when creating home screens, still other ways of populating panes with content may be used. For instance, simply by selecting (e.g., highlighting the pane and pressing a select button, or touching a pane on a rendering of the home screen presented on a tablet computer) one or more of the following may occur: (1) A UI may be presented for the user to enter information related to the desired content (e.g., a channel number), (2) The pane may itself present an entry field or text box (e.g., rendered on or overlaid on) once the pane has been selected so that the user can type or otherwise enter the desired information directly into the pane, press an enter or select key or selector, and subsequently the TV or tablet computer may locate the content typed into the box, and/or (3) The user may simply follow setup UIs to insert content without specifying particular panes in which each piece of content should be placed, and the TV may then sequentially or randomly insert content into panes (e.g., the first selection is entered into the top left pane, then the next selection is entered into the middle left pane, etc. so that content is inserted sequentially top to bottom, left to right). The home screen title area described above may be similarly modified using edit functions.

As but one more example of creating a home screen, a user may select a "news" template to use as the basis for a new home screen, and then all the panes may simply and/or automatically be pre-populated with news-related content. The user may then move the focus/cursor to any box to edit the content presented thereon by selecting from a list of pre-populated news feeds. The user may also change the category/genre associated with that pane completely such that the pane subsequently presents content related to a different genre while the remaining panes still present news-related content.

Present principles also recognize that, e.g., in an instance where content such as a television channel is being presented on a TV but no home screen is currently presented, once a home screen is requested to be presented on the TV's display (e.g., by selecting a "home" key on an RC), the content that was being presented may be "minimized" such that the home screen is presented responsive to the home screen request and the content that was presented on the whole display then occupies at least one of the panes (e.g., the "main" pane) of the home screen (e.g., regardless of whether or not the content and home screen pertain to the same genre(s)), while the rest of the panes may be populated as described above.

For completeness, also note that in some embodiments a particular customized home screen need not always present the same content in the same panes each time it is requested for presentation on the TV, and instead the content may dynamically change. For instance, if the "news" home screen is selected during the daytime, a major network TV channel may be presenting entertainment content and thus it may be determined to not include that channel in one of the panes. However, during the evening time, that same channel may be broadcasting its nightly news program, and if the "news" home screen was selected for presentation during the airing of that nighttime news program, the TV (e.g., it's processor) may identify it accordingly and include it in a pane of the the "news" home screen.

Additionally, note that as disclosed herein, home screens need not be associated with a particular genre and in some instances may include content, apps, etc. from multiple genres (e.g., half of the panes populated with content form one genre, with the other panes populated with content from another genre) or content, apps, etc. that may not themselves be associated any genres. Thus, for instance, a user may customize a home screen that includes a news channel in one pane, a social networking application in another pane, a video game (e.g., Solitaire) in another pane, an EPG in yet another pane, and a sports debate program in still another pane. Present principles further recognize that any of the panes described above may be related to, e.g., audio content such that an AM, FM, or XM radio signal indicator may be presented in the pane while audio content from that radio station is presented through the TV's speakers (although it is to be understood that in some implementations the pane may be blank while audio from the radio station is presented). Similarly, e.g., an MP3 music file may be presented through the TV speakers while the track title and artist associated with the file are indicated in the pane.

Present principles also recognize that, as used herein, the term "selector" may be, e.g., a selectable link, a radio button, a check box, etc., any or all of which may be input to the TV processor by selecting an "enter" selector or a "submit" selector in some embodiments. Also note in some instances, e.g., a single pane may present two forms of content such as, e.g., AV content from a TV channel with EPG data such as the title of the program at the bottom of the pane.

Last, note that present principles recognize that more than one home screen may be created at one time.

It is to be understood that software code implementing any or all of the logic described herein may be executed by the processors described herein and may be stored in the computer readable storage mediums described herein, it being understood that present principles may be implemented by state logic as well as deterministic logic flows. Moreover, the figures described herein generally show methods steps in conjunction with the devices, apparatuses, and elements disclosed herein. It is to be further understood that present principles may be implemented in varying embodiments without one or more of the details described herein.

Accordingly, it is to be understood that the particular steps and sequences of steps described herein are exemplary and should not be read to limit the disclosure or the claims. Indeed, variations of the user interfaces and flow charts disclosed herein are understood to be within the scope of the present application. Therefore, it is to be understood that in some instances, the functions and logic steps described herein may occur out of the exemplary order shown in the figures.

While the particular USER-DEFINED HOME SCREEN FOR ULTRA HIGH DEFINITION (UHD) TV is herein shown and described in detail, it is to be understood that the subject matter which is encompassed by the present invention is limited only by the claims.

What is claimed is:

1. A method comprising:
   presenting plural multi-pane templates on a display of an audio video device (AVD);
   populating panes of at least a user-selected first template with content;
   subsequently presenting the first template responsive to a user invocation signal;
   enabling a user to select first and second templates as first and second home screens;
   presenting the first home screen responsive to user manipulation of an input element responsive to the AVD presenting a first content genre; and
   presenting the second home screen responsive to user manipulation of the input element responsive to the AVD presenting a second content genre different from the first content genre.

2. The method of claim 1, wherein the plural multi-pane templates are presented on the display simultaneously.

3. The method of claim 1, wherein the panes are populated with content responsive to user content selection.

4. The method of claim 1, comprising:
   receiving a user selection of the first template;
   responsive to user modification signals, modifying the first template, the modifying comprising re-sizing at least a first pane of the first template relative to sizes of other panes of the first template.

5. Audio video device (AVD) comprising:
   at least one computer memory that is not a transitory signal and that comprises instructions executable by at least one processor to:
   presenting plural multi-pane templates on at least one first display of the AVD;
   populating panes of at least a user-selected first template with content;
   subsequently presenting the first template responsive to a user invocation signal;
   enabling a user to select first and second templates as first and second home screens;
   presenting the first home screen responsive to user manipulation of an input element responsive to the AVD presenting a first content genre; and
   presenting the second home screen responsive to user manipulation of the input element responsive to the AVD presenting a second content genre different from the first content genre.

6. The AVD of claim 5, comprising the at least one first display, wherein the at least one first display is an ultra high definition (UHD) display.

7. The AVD of claim 5, wherein the instructions are executable to present the plural multi-pane templates on the at least one first display simultaneously to enable a user to select at least one of the templates as a home screen template.

8. The AVD of claim 5, comprising a TV remote commander (RC) configured for wirelessly communicating with the at least one processor.

9. The AVD of claim 8, wherein the instructions are executable to present the user-selected template as a home screen responsive to selection of a home key on the RC.

10. The AVD of claim 5, wherein the instructions are executable to present one and only one template on the at least one first display at a time, the instructions also being executable to sequentially present additional templates on the at least one first display responsive to a user scroll command.

11. The AVD of claim 5, wherein the instructions are executable to present one and only one template on the at least one first display at a time, the instructions also being executable to sequentially present additional templates on the at least one first display responsive to an elapse of a timeout period without user input.

12. The AVD of claim 5, wherein the instructions are executable to fill panes of a user-selected template with user-selected content.

13. The AVD of claim 5, wherein the instructions are executable to fill panes of a user-selected template with content that is not defined by a user.

14. The AVD of claim 5, wherein the instructions are executable to receive at least one template modification signal to cause the at least one processor to re-size a pane on a template.

15. The AVD of claim 5, wherein the instructions are executable to receive at least one template modification signal to cause the at least one processor to add and/or delete a pane from a template.

\* \* \* \* \*